(12) United States Patent
Wiedner

(10) Patent No.: US 6,755,523 B1
(45) Date of Patent: Jun. 29, 2004

(54) GLASSES

(75) Inventor: Klaus Wiedner, Fürth (DE)

(73) Assignee: Uvex Arbeitsschutz GmbH, Fürth (DE)

( * ) Notice: Subject to any disclaimer, the term of this patent is extended or adjusted under 35 U.S.C. 154(b) by 0 days.

(21) Appl. No.: 10/470,923

(22) PCT Filed: Jan. 17, 2002

(86) PCT No.: PCT/EP02/00425
§ 371 (c)(1),
(2), (4) Date: Jan. 15, 2004

(87) PCT Pub. No.: WO02/061495
PCT Pub. Date: Aug. 8, 2002

(30) Foreign Application Priority Data

Feb. 1, 2001 (DE) ..................... 201 01 724 U

(51) Int. Cl.$^7$ .............. G02C 5/08; G02C 5/20
(52) U.S. Cl. ............. 351/63; 351/115; 351/153; 16/228
(58) Field of Search .............. 351/63, 115, 153, 351/41; 16/228, 244

(56) References Cited

U.S. PATENT DOCUMENTS 3,476,466 A    11/1969  Hopkins
6,439,716 B1 *  8/2002  Ku ............................ 351/63

FOREIGN PATENT DOCUMENTS

| DE | 197 21 306 | 11/1998 |
| DE | 201 01 724 | 4/2001 |
| EP | 0 656 557 | 6/1995 |
| EP | 0 749 028 | 12/1996 |
| FR | 2 751 431 | 1/1998 |
| GB | 826 533 | 7/1949 |
| GB | 2 168 499 | 6/1986 |

* cited by examiner

Primary Examiner—Hung X. Dang
(74) Attorney, Agent, or Firm—Browdy and Neimark, P.L.L.C.

(57) ABSTRACT

In a pair of glasses comprising at least a sight piece (2) and two side members (4) which are joined to the sight piece (2) or to a frame (3) that is allocated to the sight piece, pivotably about a substantially horizontal pivoting axis (14), it is provided that the side members (4) are pivotable by 180° towards the inside of the sight piece (2).

6 Claims, 3 Drawing Sheets

GLASSES

The invention relates to a pair of glasses comprising at least a sight piece and two side members which are joined to the sight piece or to a frame that is allocated to the sight piece, pivotably about a substantially horizontal pivoting axis.

When glasses are no longer worn, the side members may be folded, conventionally saving space. Hinges enable the side members to be folded. When folded, the side members must be in alignment with each other, resting nearly in parallel and directly on the sight piece. The glasses then have a compact structure and may be carried in cases or the like. Customarily, a certain distance is left between the side members and the sight piece, meaning that the side members do not rest directly on the sight piece. This problem becomes especially obvious when the frame and the side members are comparatively strongly curved. Space is wasted by this distance between side members and sight piece, which may be troublesome when the glasses are carried. Because of this distance, the folded side members are not sufficiently protected by the strong frame when the glasses are carried around.

It is an object of the invention to embody a pair of glasses with side members of the type mentioned at the outset in such a way that the side members, when folded, rest alongside the sight piece.

According to the invention, this object is attained in that the side members are pivotable by 180° towards the inside of the sight piece.

The space required by such a folded pair of glasses is decidedly reduced by this design, even if the frame is strongly curved for optimal fitting a wearer's head. No longer standing as far away from the sight piece, the side members are better protected by the stable frame.

In keeping with another embodiment of the invention, provision is by advantage made for the sight piece and the side members to be curved, with the radius of curvature of the side members at least approximately corresponding to the radius of curvature of the sight piece.

The two nearly identical radii enable the side members, when folded, to rest alongside and close to the sight piece and confer optimal fitting properties to the glasses.

Provision is further made for the side members to be mounted pivotably on the sight piece in such a way that their distance from the sight piece changes upon folding.

In this way the side members, when folded, will rest one on top of the other in parallel.

In keeping with an advantageous embodiment, the bearing is formed by a pin reaching into a hole, with the head of the pin projecting over the diameter of the hole.

This design helps attain manufacture at a low cost and reliable functioning of the bearing.

Provision is further made for the head of the pin to be divided by a slit.

Pressing together the two halves of the head helps put into practice simple assembly and detachment of the side members and the sight piece.

By advantage, the pin and the side members form a single piece.

Few components are required for the manufacture of glasses according to the invention. Manufacture at a low cost is feasible.

Details of the invention will become apparent from the ensuing description of a preferred embodiment, taken in conjunction with the drawing, in which.

Figure 1:
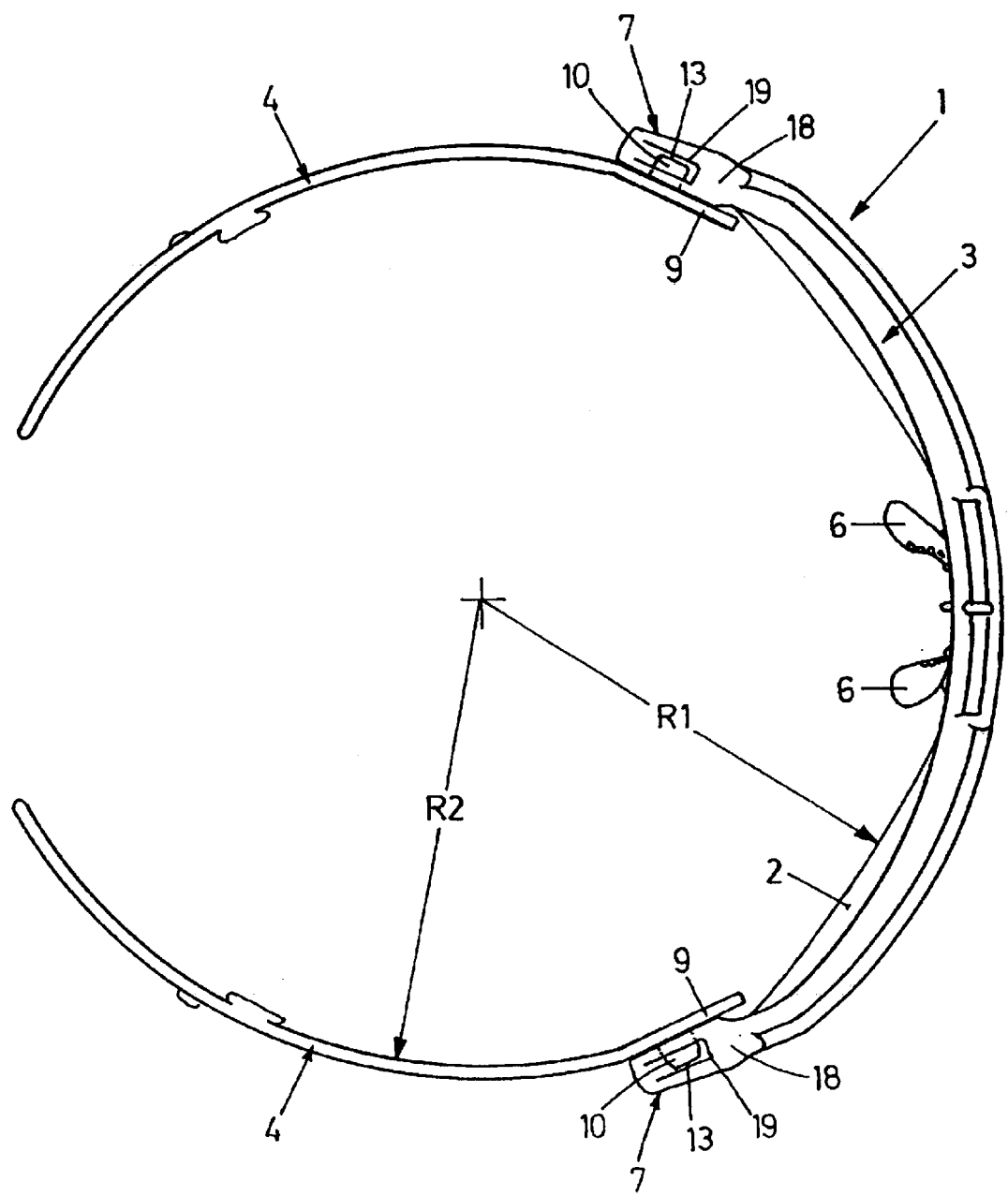
FIG. 1 is a plan view of a pair of glasses according to the invention.
Figure 2:
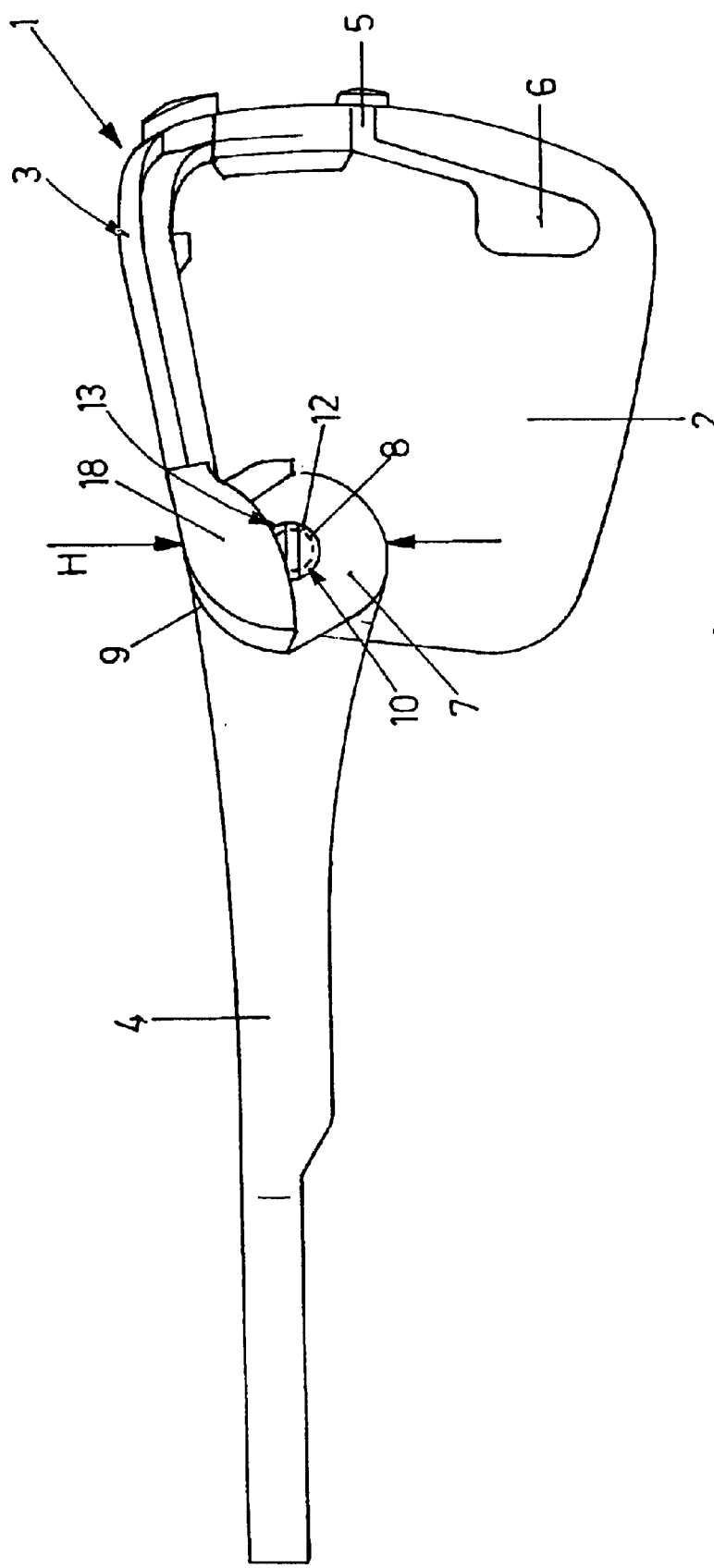
FIG. 2 is a side view of a pair of glasses.
Figure 3:
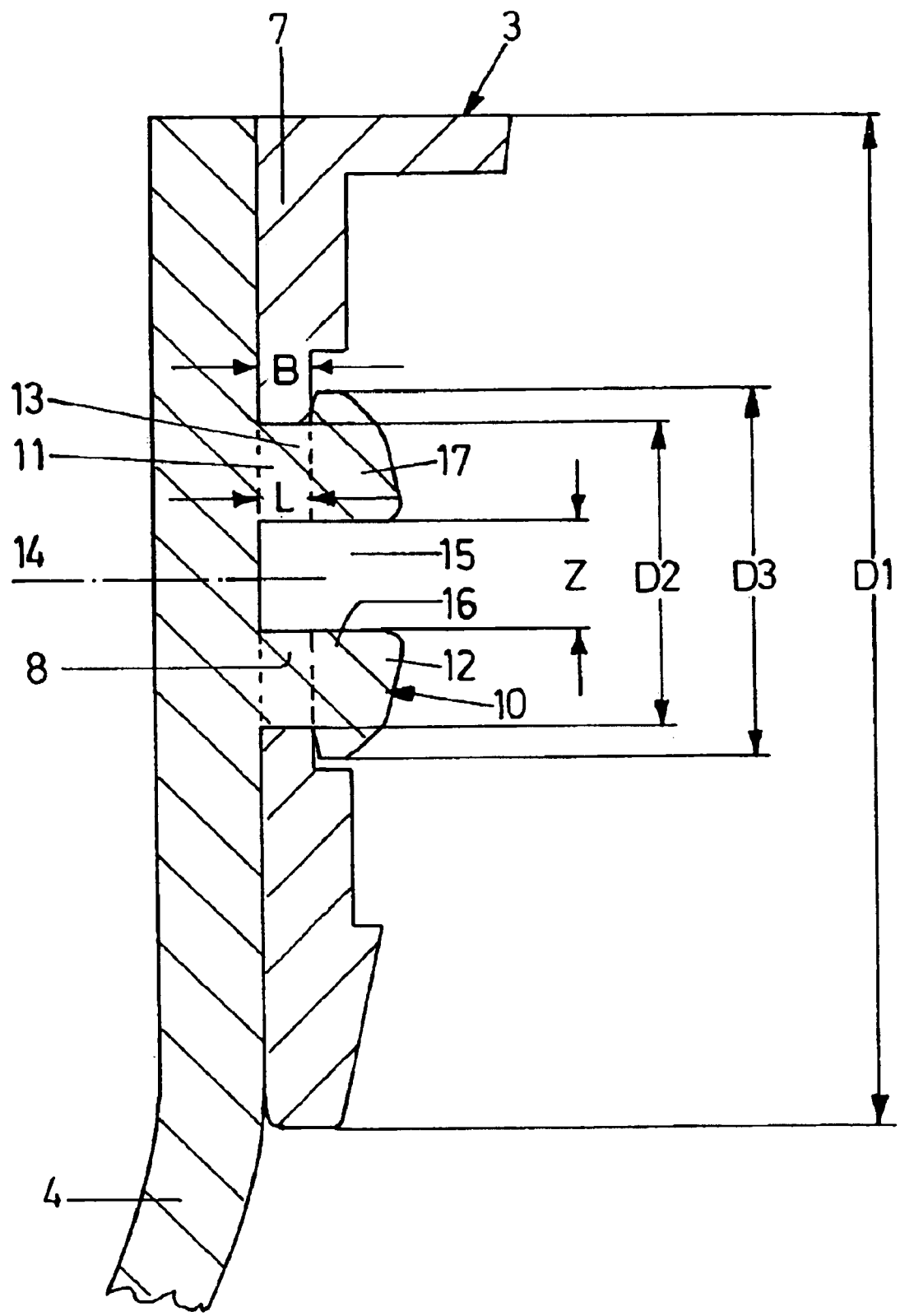
FIG. 3 is a sectional view of a bearing.

A pair of glasses denoted by 1 substantially includes a sight piece 2, a frame 3 and side members 4, with the frame 3 having a bridge piece 5 with nose pieces 6 and two lateral, approximately circular receptacles 7 of a diameter D1. The receptacles 7 by the side of the frame 3, the side member 4 and the frame 3 form a single piece. The sight piece 2 is recessed in the vicinity of the receptacle 7. Furthermore, the receptacle 7 has a hole 8 of a diameter D2. The bottom side of the receptacle 7 is plane, directly and planely resting on the starting piece 9 which is also plane.

The height of the strongly curved side members 4 decreases from the starting piece 9 that rests on the frame 3, the starting piece 9 having the height H. The height H of the starting piece 9 approximately corresponds to the diameter D1 of the receptacle 7.

The starting piece 9 of the side member 4 further comprises a pin 10 of round cross-sectional shape, the root 11 of which also has the diameter D2 and is integral with the side member 4. The length L of the root 11 is equal to the width B of the receptacle 7 in the vicinity of the hole 8. The approximately conical, blunt head 12 of the pin has a greater diameter D3 by which it laterally juts out the hole 8.

The positive fit of the pin 10 into the hole 8 constitutes a bearing 13 with a substantially horizontal pivoting axis 14. This design of a bearing permits the side members 4 to be folded by 180° towards the inside of the sight piece 2. The curvature R1 of the sight piece 2 approximately corresponding to the curvature R2 of the side member 4, the side member 4 rests by its entire length alongside the inside of the sight piece 2. With the head 12 of the pin projecting over the hole 8, lateral fixing of the head 12 is accomplished. The side members 4 are prevented from resting directly on the sight piece 2 by a bridge piece.

The head 12 of the pin 10 has a straight, rectangular slit 15 of a width Z whereby the head 12 is split into two halves 16 and 17. Pressing together the two halves 16 and 17 of the pin 10 enables the side members 4 to be rapidly detached from, or attached to, the frame 3, with the width Z of the slit 15 exceeding the difference of the diameter D3 from the diameter D2.

By the side of the projecting head 12, the receptacle 7 has a width greater than the width B for stability reasons.

The two bearings 13 of the glasses 1, which are fundamentally identical, slightly differ in dimensions so that the side members 4, when folded, will rest on top of each other and in parallel.

The receptacle 7 widens on the top side 18 and is provided with a rectangular recess 19. A parallel and spaced cover 20, which is provided on the top side 18 of the receptacle 7, partially covers the head 12 of the pin.

Provision is further made for two smaller pins (not shown) on the receptacle 7 of the starting piece 9, fixing the side member 4 when folded or unfolded. These two pins serve to fix the side member 4 in a final position.

Elevations or depressions may be provided between the inside of the ends of the inner side members and the outside of the frame which these ends rest on pivotably, allowing to put into practice defined positions of inclination.

What is claimed is:

1. A pair of glasses, comprising at least a sight piece (2) and two side members (4) which are joined to the sight piece (2) or to a frame (3) that is allocated to the sight piece, pivotably about a substantially horizontal pivoting axis (14), and which are foldable towards the inside of the sight piece (2), characterized in that the side members (4) are mounted on the sight piece (2) pivotably by 180° such that the distance thereof from the sight piece (2) changes upon folding and the side members, when folded, rest in parallel one on top of the other.

2. A pair of glasses according to claim 1, characterized in that the sight piece (2) and the side members (4) have a curvature, with the radius of curvature R2 of the side members (4) at least approximately corresponding to the radius of curvature of the sight piece (2).

3. A pair of glasses according to claim 1, characterized in that the side members (4) are pivotably mounted on the sight piece (2) such that the distance thereof from the sight piece (2) changes upon folding.

4. A pair of glasses according to claim 3, characterized in that the bearing (13) is formed by a pin (10) which engages with a hole (8), with the head (12) of the pin (10) projecting over the diameter D2 of the hole (8).

5. A pair of glasses according to claim 4, characterized in that the head (12) is split by a slit (15).

6. A pair of glasses according to claim 1, characterized in that the pin (10) and the side members (4) are formed in one piece.

* * * * *